United States Patent
Kunis et al.

(10) Patent No.: US 11,036,207 B2
(45) Date of Patent: Jun. 15, 2021

(54) METHOD, NUMERICAL CONTROL DEVICE AND MACHINE TOOL FOR MACHINING A WORKPIECE

(71) Applicant: SIEMENS AKTIENGESELLSCHAFT, Munich (DE)

(72) Inventors: Kathrin Kunis, Chemnitz (DE);
Reinhard Simons, Horb (DE);
Andreas Uhlich, Wendelstein (DE);
André Vieweg, Chemnitz (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/437,868

(22) Filed: Jun. 11, 2019

(65) Prior Publication Data
US 2019/0377332 A1    Dec. 12, 2019

(30) Foreign Application Priority Data
Jun. 12, 2018   (EP) .................................... 18177170

(51) Int. Cl.
G05B 19/418    (2006.01)
G05B 19/18     (2006.01)

(52) U.S. Cl.
CPC ..... *G05B 19/41825* (2013.01); *G05B 19/182* (2013.01); *G05B 2219/35096* (2013.01)

(58) Field of Classification Search
CPC .................. G02B 19/29; G02B 19/402; G02B 2219/36199; G02B 2219/33258; G02B 2219/34015
See application file for complete search history.

(56) References Cited

U.S. PATENT DOCUMENTS 5,604,677 A * 2/1997 Brien ................ G05B 19/4068
                                                       700/186
5,713,253 A 2/1998 Date et al.
(Continued)

FOREIGN PATENT DOCUMENTS

DE   19537292 A1   4/1998
DE   19848642 A1   4/2000
JP   2011011295 A  1/2011

OTHER PUBLICATIONS

DMG MORI: 1134 exklusive DMG MORI Technologiezyklen Komplexe Bearbeltungen einfach reallsiert, Internet, XP055524030, Gefunden im Internet: URL:https://de.dmgmori.com/resource/blob/44742/8d20729e244f0c22ecf70f68ffld9c97/plsde-dmg-mori-technology-cycles-pdf-data.pdf; [gefunden am Dec. 4, 2018], pp. 29-31; 2017.

*Primary Examiner* — Rina I Duda
(74) *Attorney, Agent, or Firm* — Henry M. Feiereisen LLC

(57) ABSTRACT

Relative movement between a tool and a workpiece for machining the workpiece with a machine tool is controlled by defining a machine coordinate system (MKS) relative to a machine base of the machine tool and a rotation coordinate system (RKS) relative to the MKS by defining the origin of the RKS in the MKS, defining the orientation of a selected coordinate axis of the RKS in the MKS, defining an axis of rotation around which the RKS rotates in the MKS, defining an angular velocity with which the RKS rotates around the axis of rotation, defining a tool path in the RKS, and controlling the relative movement according to the defined tool path. With this procedure, complex movements of a machine tool, in particular in connection with so-called interpolation turning, can be described or programmed in a relatively simple manner.

19 Claims, 5 Drawing Sheets

(56) References Cited

U.S. PATENT DOCUMENTS

| | | | |
|---|---|---|---|
| 6,456,897 B1* | 9/2002 | Papiernik | G05B 19/4086 700/194 |
| 6,539,274 B1 | 3/2003 | Rauth et al. | |
| 7,622,833 B2* | 11/2009 | Haase | G05B 19/19 310/12.01 |
| 8,024,068 B2* | 9/2011 | Gray | G05B 19/19 700/252 |
| 9,068,828 B2* | 6/2015 | Otsuki | B23Q 17/0995 |
| 9,454,156 B2* | 9/2016 | Chung | G05D 1/0274 |
| 2006/0016957 A1* | 1/2006 | Hofmann | A43D 95/14 250/201.1 |
| 2008/0121078 A1* | 5/2008 | Kunimatsu | B24B 1/04 83/13 |
| 2009/0299390 A1* | 12/2009 | Dehnad | A61B 17/12113 606/158 |
| 2016/0026169 A1* | 1/2016 | Sasaki | G05B 19/402 700/194 |
| 2017/0066080 A1* | 3/2017 | Zeniya | B23K 26/38 |

* cited by examiner

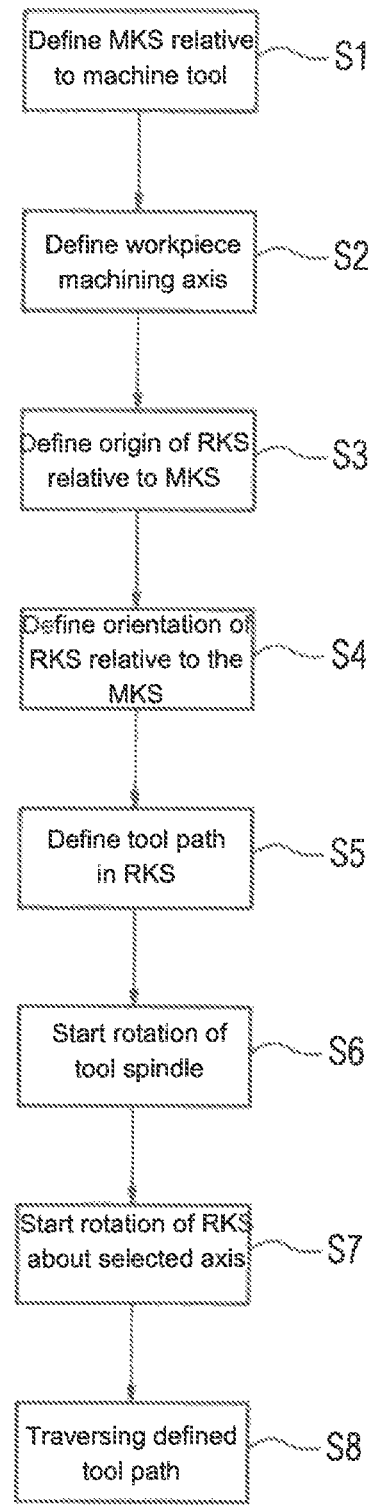

METHOD, NUMERICAL CONTROL DEVICE AND MACHINE TOOL FOR MACHINING A WORKPIECE

CROSS-REFERENCES TO RELATED APPLICATIONS

This application claims the priority of European Patent Application, Serial No. EP 18177170.0, filed Jun. 12, 2018, pursuant to 35 U.S.C. 119(a)-(d), the content of which is incorporated herein by reference in its entirety as if fully set forth herein.

BACKGROUND OF THE INVENTION

The present invention relates to a method and a numerical control device for controlling a relative movement between a tool and a workpiece for machining the workpiece using a machine tool. Furthermore, the invention relates to a machine tool for machining a workpiece using a tool, with at least three translational axes and at least one rotational axis, as well as a tool spindle that can be rotated around a tool spindle axis for the relative movement of a tool connected to the tool spindle relative to a workpiece affixed to a workplace holder of the machine tool.

The following discussion of related art is provided to assist the reader in understanding the advantages of the invention, and is not to be construed as an admission that this related art is prior art to this invention.

In some machine tools known in the art, a tool spindle rotates synchronously around a tool spindle axis and around an axis of rotation such that a tool cutting edge performs a turning process on a workpiece held in a fixed position in the machine tool. Whereas in classical turning, the contour of rotation is determined by the movement of the tool relative to the workpiece rotating around a workpiece axis, in the case of interpolation turning known in the art, the tool moves with an oriented cutting edge around the axis of symmetry of the workpiece along the contour to be produced.

A disadvantage of the known method of interpolation turning is that, in order to define the tool paths, special cycles must be used when cutting a contour in a machining plane. Defining the tool paths is therefore complex and involves considerable effort.

It would therefore be desirable and advantageous to obviate prior art shortcomings and to provide an improved method for controlling a machine tool, a numerical control device, and a machine tool, which simplify the generation of tool paths for machining a workpiece.

SUMMARY OF THE INVENTION

According to one aspect of the present invention, a method for controlling a relative movement between a tool and a workpiece for machining the workpiece using a machine tool includes
  defining a machine coordinate system (MKS) in relation to a machine base of the machine tool,
  defining a rotation coordinate system (RKS) in relation to the machine coordinate system (MKS) by:
    defining an origin of the rotation coordinate system (RKS) in the machine coordinate system (MKS),
    defining in the machine coordinate system (MKS) an orientation of at least one selected coordinate axis of the rotation coordinate system (RKS),
    defining an axis of rotation about which the rotation coordinate system (RKS) rotates in the machine coordinate system (MKS),
    defining an angular velocity with which the rotation coordinate system (RKS) rotates about the axis of rotation,
  defining at least one tool path in the rotation coordinate system (RKS), and
  controlling the relative movement according to the tool path defined in the rotation coordinate system (RKS).

According to another aspect of the present invention, a numerical controller controlling relative movement between a tool and a workpiece for machining the workpiece with a machine tool is configured to:
  define a machine coordinate system (MKS) in relation to a machine base of the machine tool,
  define a rotation coordinate system (RKS) in relation to the machine coordinate system (MKS) by:
    define an origin of the rotation coordinate system (RKS) in the machine coordinate system (MKS),
    define in the machine coordinate system (MKS) an orientation of at least one selected coordinate axis of the rotation coordinate system (RKS),
    define an axis of rotation about which the rotation coordinate system (RKS) rotates in the machine coordinate system (MKS),
    define an angular velocity with which the rotation coordinate system (RKS) rotates about the axis of rotation,
  define at least one tool path in the rotation coordinate system (RKS), and
  control the relative movement according to the tool path defined in the rotation coordinate system (RKS).

According to yet another aspect of the present invention, a machine tool for machining a workpiece using a tool affixed to a workpiece holder of the machine tool includes:
  a tool spindle rotatable about a tool spindle axis and holding a tool constructed to machine the workpiece,
  at least three translational axes and at least one rotational axis, and
  a numerical controller controlling a relative movement between the tool and the workpiece,
  wherein the numerical controller is configured to:
    define a machine coordinate system (MKS) in relation to a machine base of the machine tool,
    define a rotation coordinate system (RKS) in relation to the machine coordinate system (MKS) by:
      define an origin of the rotation coordinate system (RKS) in the machine coordinate system (MKS),
      define in the machine coordinate system (MKS) an orientation of at least one selected coordinate axis of the rotation coordinate system (RKS),
      define an axis of rotation about which the rotation coordinate system (RKS) rotates in the machine coordinate system (MKS),
      define an angular velocity with which the rotation coordinate system (RKS) rotates about the axis of rotation,
    define at least one tool path in the rotation coordinate system (RKS), and
    control the relative movement according to the tool path defined in the rotation coordinate system (RKS).

The term "controlling" refers to its common use in control technology. However, the term also includes "regulating."

As is common, a (fixed) machine coordinate system, hereinafter referred to as MKS, is defined in relation to a machine base of the machine tool. Advantageously a Cartesian coordinate system may be selected for this purpose, which is aligned such that the coordinate axes are aligned parallel to three or the three translational axes (linear axes) of the machine tool. This reduces the computing effort to calculate the individual axis movements to depart from a certain tool path. In principle however it is possible to select any position of the coordinate point of origin and orientations of the coordinate axes.

Furthermore, in the present invention, a rotation coordinate system, hereinafter referred to as RKS, is also defined in relation to the machine coordinate system. In principle, this can also be any coordinate system. Advantageously, however, a Cartesian coordinate system may be selected for this purpose. The coordinates of a point defined in the MKS can be specified in the RKS and vice versa through a corresponding coordinate transformation. Points along the path, or tool paths, can accordingly be transferred or translated from one coordinate system into another. The use of coordinate transformations hi machine tools is generally known and hence conventional.

In general, the present invention provides for the RKS to be defined in the MKS by stipulating the coordinate point of origin with respect to the MKS and by stipulating the orientation of at least one selected coordinate axis (for example the z' axis) of the RKS. The orientations of the two remaining coordinate axes can be defined in any way. Preferably three coordinate axes are defined in the RKS such that they form a Cartesian coordinate system.

Furthermore, an axis of rotation around which the RKS rotates in the MKS, and an angular velocity with which the RKS rotates around the axis of rotation, are defined. Advantageously, an axis may be selected as the axis of rotation that does not coincide with an axis of the MKS. The angular velocity may also be defined so as to correlate with a spindle speed of a tool spindle of the machine tool. In particular, the angular velocity corresponds to the spindle speed.

With this procedure, workpiece contours or tool paths can be defined or described makes for many uses of machine tool. In other words, the relative movements between the tool and the workpiece can be defined or described in a relatively simple manner in the RKS, while producing relatively complex movements of the machine axes or relatively complex movements of the tool relative to the workpiece in the MKS.

Hereinafter, it will be assumed that both the MKS and the RKS are Cartesian coordinate systems. However, the procedure demonstrated below may in principle be applied analogously to any coordinate systems. The use of Cartesian coordinate systems is common in connection with machine tools and facilitates the calculation of points on the path in different coordinate systems.

According to another advantageous feature of the present invention, at least the position and orientation of the axis of rotation, but likewise also the position and orientation of the RKS, may be aligned with a workpiece machining axis. The workpiece machining axis is advantageously an axis of symmetry of a subsection of the workpiece (workpiece section) to be machined, which is at least substantially rotationally symmetrical. This workpiece section is preferably to may be machined in accordance with the invention by way of interpolation turning. The workpiece machining axis is determined from the geometric data of the workpiece in conjunction with the clamping.

Advantageously, the axis of rotation may be aligned relative to the workpiece such that the axis of rotation coincides with the workpiece machining axis of the workpiece. The RKS then rotates around the workpiece machining axis.

In a further simplification, the selected coordinate axis (z') may be oriented parallel to the axis of rotation.

According to another advantageous feature of the present invention, especially when used with "Interpolation turning", the coordinate point of origin of the RKS may be defined in the MKS, for example by specifying a displacement vector, such that the origin of the RKS coordinate system lies on the workpiece machining axis. In principle, any point on the workpiece machining axis can function as the origin of the RKS coordinate system.

Furthermore, the position and orientation of the selected coordinate axis (z' axis) may be selected so as to coincide with the workpiece machining axis. As a result, turning cycles, which define for example a contour in the x-z plane and have already been created for conventional turning tools, can be used for "interpolation turning" machining in the RKS.

Once a selected axis of the RKS (z' axis) and the origin of the RKS have been defined, an orientation of a further axis (x axis) of the RKS can be defined as a function of the type of rotation of the RKS (e.g. Euler or RPY) around the selected axis (z' axis). Advantageously, the axes of the RKS are defined in relation to the position and orientation of the tool spindle axis in its starting position such that the tool spindle axis lies in a plane spanned by the selected axis (z') and the further axis (x'). As is typical for turning, the tool is then moved in in the x' direction at y=0.

Advantageously, the tool spindle axis may be aligned parallel to the selected axis (z'). This corresponds to the most common arrangement in a conventional turning tool.

With an active transformation and with the tool spindle switched on, the tool spindle advantageously rotates around the tool spindle axis and synchronously the tool spindle axis rotates around the selected axis (z') in relation to the MKS, so that as the tool spindle rotates around the tool spindle axis, the tool spindle axis rotates around the selected axis (z'). As a result, during one rotation around the section of the workpiece to be machined, the tool cutting edge is always aligned toward the axis of symmetry of the section of the workpiece to be machined. However, in particular with a multi-edge tool, the rotational speeds may also differ from one another.

According to the present invention, rotationally symmetrical subsections of an intrinsically rotationally asymmetrical workpiece can be machined relatively easily using interpolation turning. In particular, a desired contour of the workpiece need no longer be divided in a multiplicity of tool paths through special cycles. Instead, simple turning cycles can be used for this purpose.

In many use cases, the machining axis of the workplace may be positioned in the x-y plane of the MKS by skillful clamping of the workpiece in the machine tool. The RKS then only has to be pivoted relative to the MKS around one axis of the MKS so that the selected axis (z') coincides with the workpiece machining axis. By defining the orientation of the selected axis, the other two axes of the RKS are then also defined with respect to the MKS. For this special case, it is therefore sufficient to define the origin of the coordinate system and the orientation of the selected axis and to derive therefrom the position and orientation of the RKS in the MKS and consequently the coordinate transformation.

In order to reach a desired position and orientation of the selected axis (z'), However, it may also be necessary to rotate the RKS in space relative to the MKS around more than one axis. For example, the RKS can then be derived from the MKS by specifying the displacement vector with respect to the origin of the coordinate system and by specifying the so-called Euler angle. Coordinates of the RKS can then be converted into coordinates of the MKS and vice versa.

The orientation of the selected axis (z') is based on the workplace machining axis. In principle, an infinite number of possibilities exist for orienting the two remaining axes—even when assuming a Cartesian RKS. In order to create a clear starting situation for machining the workpiece, the orientation of a further axis of the RKS, for example the x' axis, is therefore specified. The orientation of the remaining axis, in this example the y axis, is then also determined.

However, in the context of the invention, a static coordinate transformation rather than a dynamic coordinate transformation is determined, because both an axis of rotation around which the RKS rotates in the MKS, preferably the z' axis, and also an angular velocity for the rotation are specified. This has the consequence that with an active transformation, a fixed point in the RKS rotates around the axis of rotation from the perspective of the MKS with precisely this angular velocity. The same is true for a position and orientation of a tool spindle or of a tool connected thereto which is fixed in space in the RKS. These also rotate with this angular velocity around the axis of rotation when the transformation is activated.

Advantageously, before activating the coordinate transformation, i.e. in the still static RKS, the spindle position and spindle orientation or the tool position and the tool orientation, in other words the starting position, are defined in the RKS. With an active transformation and with a synchronous rotation of the tool spindle in relation to the rotation of the RKS, the correct interpolation turning movement of the tool spindle is generated automatically.

According to another advantageous feature of the present invention, the tool spindle axis may be aligned parallel to the rotation axis of the coordinate system.

According to another advantageous feature of the present invention, the tool, in particular a tool cutting edge, is oriented toward the axis of rotation or in the opposite direction.

With the above assumptions, the tool movement in the RKS can be specified in the same way as for a 2-axis turning tool having a simple construction.

In the context of the invention, a—preferably rotationally symmetrical—contour of a workpiece or workpiece section to be created is generally specified in the RKS. Next, tool paths for generating the specified contour are calculated by using turning algorithms that are used for controlling or path generation in conventional turning tools.

In accordance with the invention, the tool paths are defined with respect to the RKS and the relative movements between the tool and workpiece are generated in accordance with the tool paths defined in the RKS. For this purpose, for the movement of the machine axes, each of the points on the path determined in the RKS are converted, using a corresponding coordinate transformation, into points on the path or axis positions of the MKS and moved to accordingly.

Advantageously, the introduction of an RKS according to the invention enables specifying the position and/or orientation of the tool spindle axis, the position and/or orientation of the tool, in particular a tool cutting edge, and the desired contour of the workpiece in the RKS. This is done analogously to the definition of the corresponding values for a conventional turning tool. Like with turning using a conventional turning tool, defining the contour preferably takes place in the x'-z' plane of the RKS. Advantageously, the controller determines therefrom, initially also in the RKS, the tool paths required to produce the contour.

The major difference compared to conventional interpolation turning is that the coordinate transformation for defining the RKS in relation to the MKS is not static but instead dynamic. Synchronously with the rotation of the tool spindle, the RKS rotates in relation to the MKS around the selected axis (z' axis) of the RKS. From the perspective of the RKS, the corresponding coupling of the machine axes means that the tool spindle and in particular the tool are in a fixed position in relation to the subsection of the workpiece to be machined, whereas this workpiece subsection rotates around its axis of symmetry, i.e. the workpiece machining axis. From the perspective of the programmer, the starting point is therefore the same as when turning with a conventional turning tool. During the rotation of the tool spindle around the tool spindle axis and the rotation of the RKS in relation to the MKS, the machining paths of the tool (tool paths) defined in the RKS are now traversed in order to produce the desired workpiece contour.

A particular advantage of the inventive procedure for the user is that existing turning cycles programmed for turning with conventional turning tools can be used to determine tool paths. The creation of new, generally highly complex special cycles for interpolation turning consequently becomes unnecessary for many applications. This is a significant advantage in terms of cost and time.

As already described above, both the MKS and the RKS are preferably Cartesian coordinate systems. In principle, other coordinate systems could be used in special cases for certain applications. Defining the origin of the coordinate system and orienting the axes of the coordinate system in relation to the subsection of the workpiece to be machined are advantageously done analogously to the corresponding selection when turning with a conventional turning tool.

The mathematical background of the invention will be explained in greater detail below. To this end, it is assumed that the kinematics of the machine can be described by a change of rotary axes, linear axes and constant offsets.

In the context of the invention, it is necessary to move to a defined point on the workpiece with a defined spatial orientation. In general, in order to move to any point with any orientation, at least three degrees of freedom of orientation and three degrees of freedom of translation are required.

Since orientations can only be changed by rotations, the kinematic chain must contain at least three rotational axes in order to be able to assume any orientation in space.

In order for the problem to be uniquely solvable, the total number of axes must be at least six, at least three of which must be embodied as rotational axes (rotary axes), The remaining three axes may be (any combination of) both rotary and also linear axes. There may be any number of constant offsets.

Note: the machine can also contain further (redundant) axes in the chain. Determining the axis positions is then no longer unambiguous, or further criteria must be used with these arrangements in order to determine the position of these axes.

An example of a kinematic configuration with three linear axes and three rotary axes will be described below:

The parts at the beginning and end of the kinematic chain and between the rotational axes are referred to as sections. In other words, there are precisely four sections. Each of these sections can contain linear axes (subject to the boundary condition that their total number is three).

With the designations $\vec{r}_n$ linear offset $\underline{A}_n$ rotation (rotational machine axis)

$\vec{u}$ tool vector $\underline{F}$ rotation of the workpiece coordinate system vis-à-vis the MKS $\vec{f}$ zero offset in the rotated workpiece coordinate system $\underline{S}$ rotation around the machining axis of the workpiece $\vec{p}$ position of the machining point in workpiece coordinates the following applies:

$$\vec{r}_1 + \underline{A}_1 * (\vec{r}_2 + \underline{A}_2 * (\vec{r}_3 + \underline{A}_3 * (\vec{r}_4 + \vec{u}))) = \underline{F} * (\vec{f} + \underline{S}(\omega t) * \vec{p}) \quad (1)$$

The linear offset $\vec{r}_n$ of the nth section is defined as $$\vec{r}_n = \vec{c}_n + \Sigma_{i=1}^{k_n} x_{n_i} * \vec{e}_{n_i} \quad (2)$$

where:

$\vec{c}_n$ constant offset $k_n$ number of linear axes in the section n $\vec{e}_{n_i}$ unit vector of the ith linear axes in the section n $x_{n_i}$ position of the ith linear axis in the section n.

For the determination of the angle of rotation of the rotations $\underline{A}_n$ (i.e. the orientation), in the above equation the displacements can be disregarded provided that $\vec{u}$ and $\vec{p}$ are defined at the starting position hi the same coordinate system as the position of the machining point. The (non-linear) matrix equation $$\underline{A}_1 * \underline{A}_2 * \underline{A}_3 = \underline{F} * \underline{S}(\omega t) \quad (3)$$

must then be solved. If the aforementioned condition is not met, a further rotation is introduced in the above equation, which however only causes a modified constant rotation $\underline{F}$ and therefore does not significantly change the problem.

With known rotations, the positions of the three linear axes can then be determined as a solution to a (linear) system of equations.

When machining at the periphery of the part to be produced, the tool must be guided with a constant orientation relative to the surface. In the case of a rotation at the periphery of the part, this means that the tool must also rotate around an axis that is parallel at all points in time to the machining axis of the workplace. Such a movement can be created in accordance with (3) by controlling the rotations described with $\underline{A}_1$ to $\underline{A}_3$ as a function of time.

Of particular interest from a technical perspective, however, is the special case where the described rotation is performed in that only a single rotary axis rotates, while the other two rotary axes do not change their position during machining, i.e. they orient the third axis such that it is parallel to the machining axis. This is typically the third axis ($\underline{A}_3$), which has to be implemented as a (position-controlled) spindle and which holds the tool.

It then follows from equation (3) for this special case that:

$$\underline{A}_1 * \underline{A}_2 = \underline{F} = \text{const. and } \underline{A}_3(\omega t + \varphi_0) = \underline{S}(\omega t) \quad (4)$$

This simplification is only possible if the tool can be correctly oriented relative to the workpiece by a suitable selection of $\varphi_0$, i.e. when the machining axis and the axis of rotation are parallel.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 8 shows major method steps for executing the method according to the present invention.

DETAILED DESCRIPTION OF PREFERRED EMBODIMENTS

Figure 1:
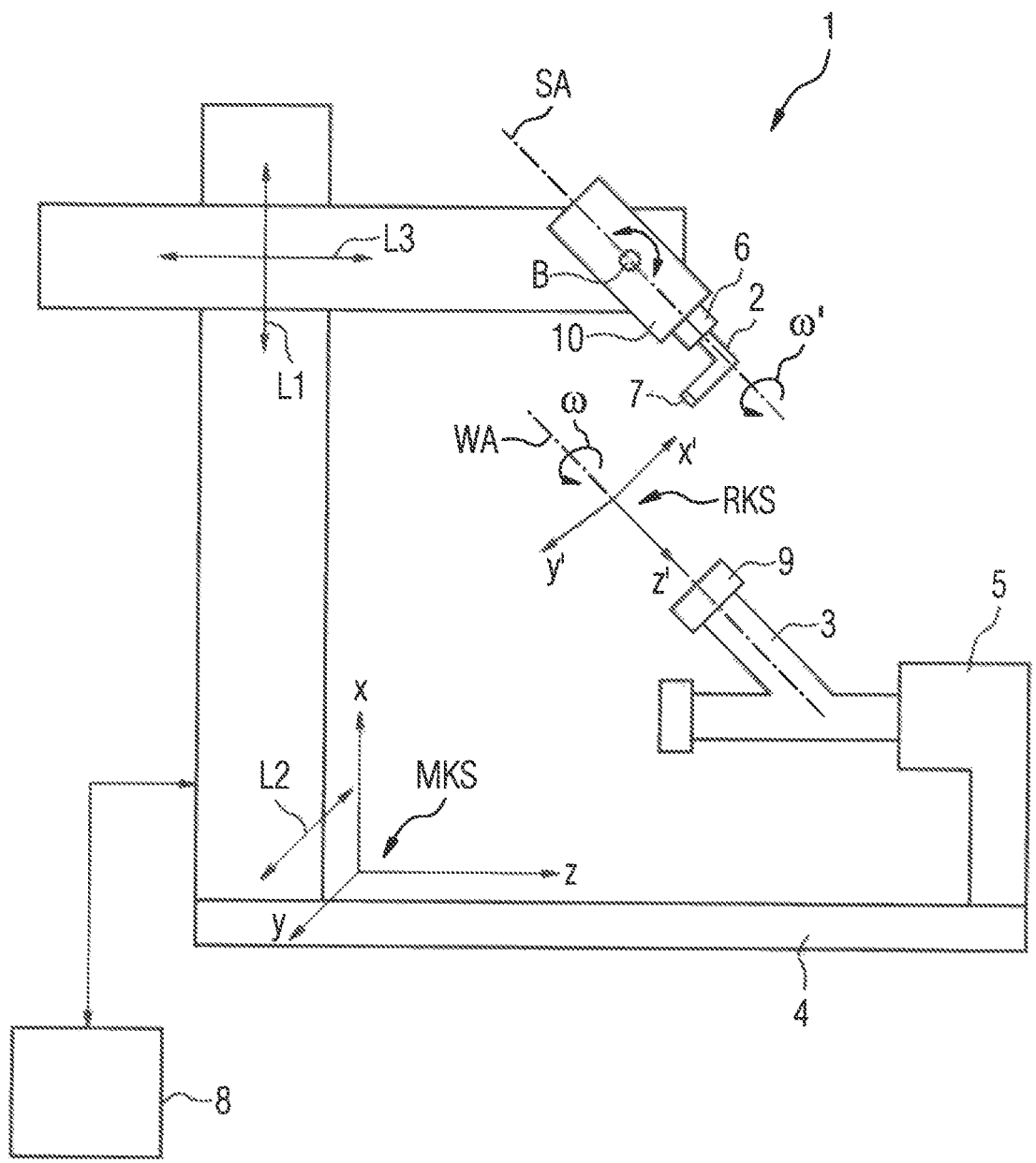
FIG. 1 shows a schematic diagram of a machine tool suitable for executing the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and hi particular to FIG. 1, there is shown a schematic, highly simplified diagram of an embodiment of the invention with a machine tool 1 having three translational axes L1, L2 and L3 (linear axes) configured to move a tool 2 relative to a workpiece 3 in three linear spatial axes. The machine tool 1 includes a (fixed) machine base 4 to which a workpiece holder 5 is affixed. One point on the fixed machine base 4 is selected as a reference point (origin) for an MKS (also fixed) with the coordinate axes x, y and z. The coordinate axes x, y and z of the MKS are advantageously selected such that the x axis is aligned parallel to L1, the y axis is aligned parallel to L2 and the z axis is aligned parallel to L3, Furthermore, a tool head that can be pivoted around a rotational axis B (rotary axis), with which the tool 2 can be pivoted around a B axis that is parallel to the y axis, is provided on the machine tool 1. The tool 2 is affixed to a tool spindle 6 enclosed within the tool head 10 and can be rotated around a tool spindle axis SA. Like the other axes, the tool spindle 6 is provided with a position-controlled drive such that any angle can be set for the tool spindle 6 and as a result a cutting edge 7 of the workpiece 2 can be oriented with respect to the tool spindle axis SA. A numerical controller 8 is provided for the coordinated position control of the individual axes of the machine tool 1.

Figure 2:
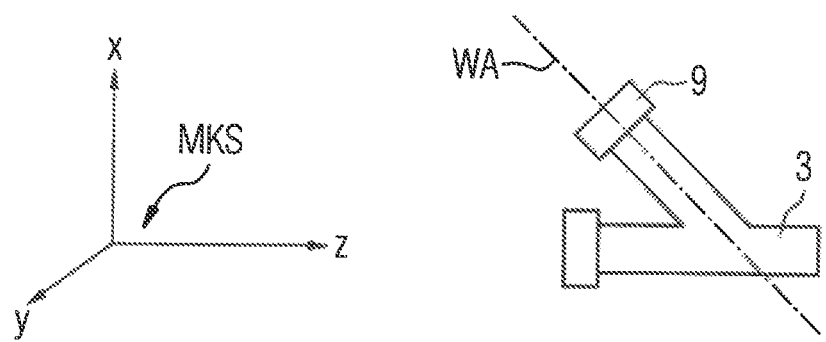
FIGS. 2 to 7 show measures for executing the method according to the invention.

FIGS. 2 to 7 show in more detail a process according to the present invention for turning the workpiece 3 shown in the exemplary embodiment of FIG. 1 when clamped, To this end, FIG. 2 once more shows the MKS with the coordinate axes x, y and z and the rotationally asymmetrical workpiece 3 clamped in a fixed position in the machine tool with a workpiece section 9 to be machined, which is rotationally symmetrical with respect to a workpiece machining axis WA.

Figure 3:
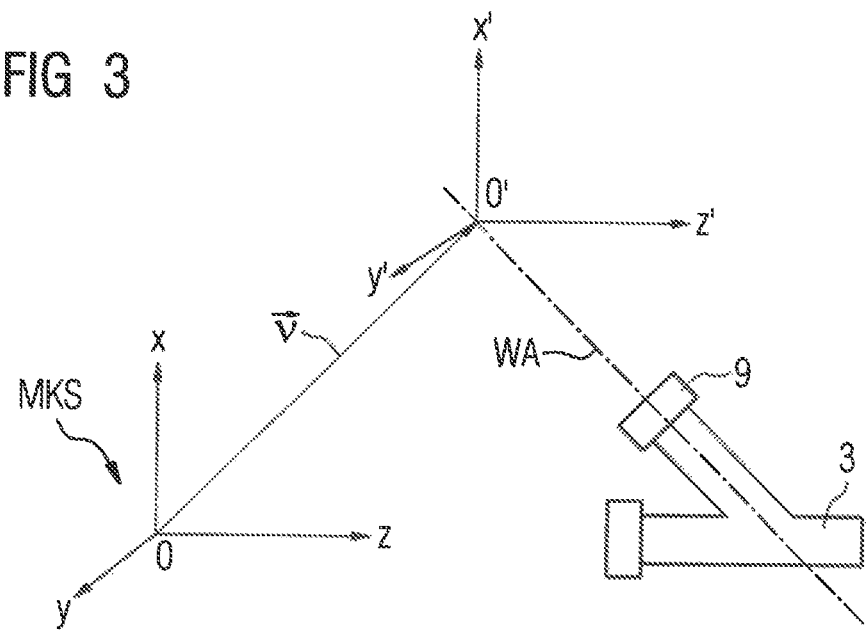

In accordance with the invention, a Cartesian RKS with the coordinate axes x', y' and z' is first defined for the machining of the workpiece 3 to be performed. As can be seen in FIG. 3, for this purpose a displacement vector $\vec{v}$ for the coordinate point of origin is first determined such that the origin 0' of the RKS coordinate system lies on the workpiece machining axis WA of the workpiece 3. In the exemplary embodiment, the workpiece machining axis WA is an axis of symmetry of a workpiece section 9 which is to be machined in accordance with the invention.

Figure 4:
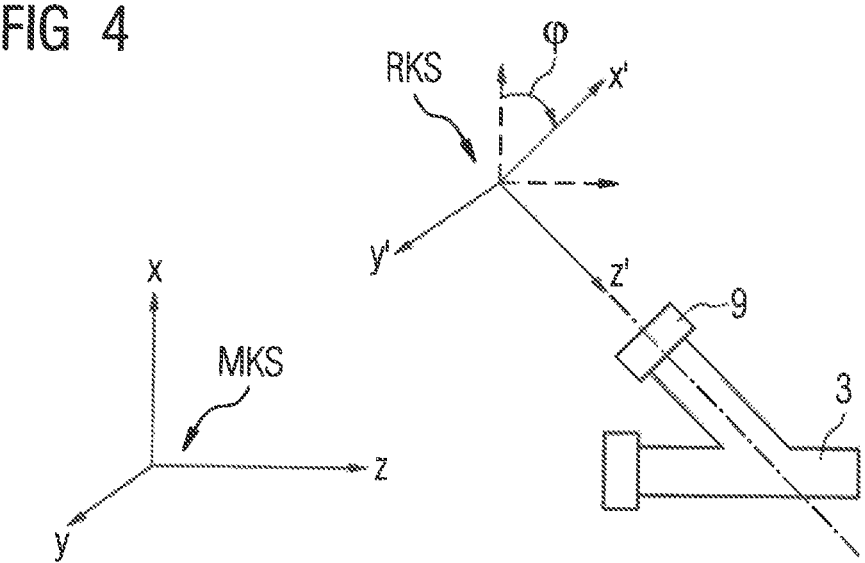

Furthermore—as can be seen in FIG. 4—the z' axis is oriented such that lies on the workpiece machining axis WA of the workpiece 3. In this exemplary embodiment, the workpiece machining axis WA lies in the x-z plane of the MKS after corresponding positioning and orientation of the workpiece 3. The orientation of the z' axis is then produced from the MKS by means of a single pivoting movement of the z axis around the y axis. It is therefore sufficient to specify a single angle $\varphi$ through which the x' axis and the z' axis must be pivoted around the y' axis in order to define the orientation of the RKS in the MKS. If the workpiece machining axis WA did not lie in the x-z plane of the MKS, at least one further pivoting movement would be necessary in order to cause the z' axis to He on the workpiece machining axis WA.

Assuming that the x' axis should also lie in the x-z plane, the orientations of the x' axis and y' axis and therefore the whole RKS are then also determined unambiguously in relation to the MKS.

Figure 5:
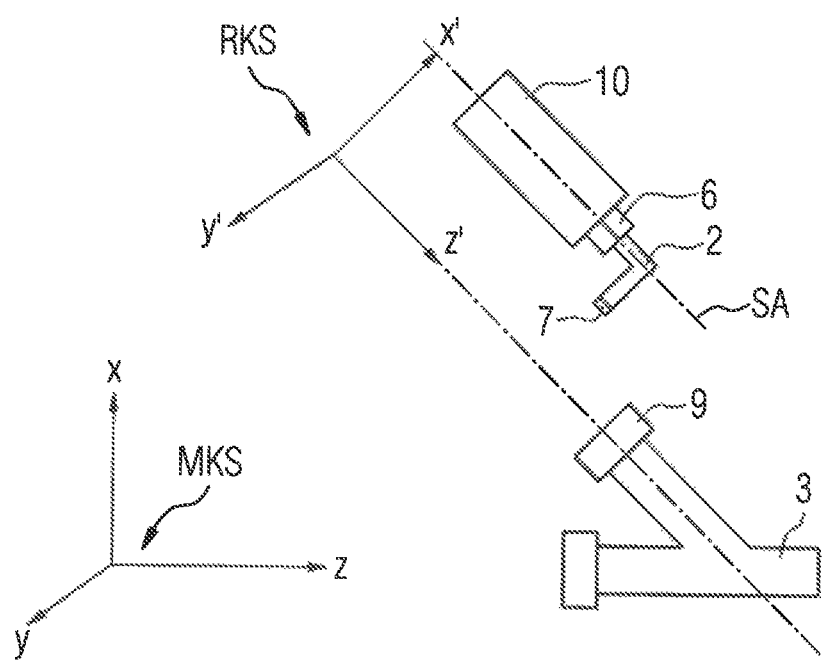

In the inventive procedure, the tool paths for machining the workpiece 3 are specified not in the MKS, but rather in the RKS. FIG. 5 illustrates the starting situation for this purpose, in which the position and orientation of the tool head 10 and in particular of the tool cutting edge 7 are specified in the RKS. In the advantageous starting position in accordance with FIG. 5, the spindle axis SA lies in the x'-z' plane and is oriented parallel to the z axis. The tool 2 is oriented opposite to the x' direction.

Figure 6:
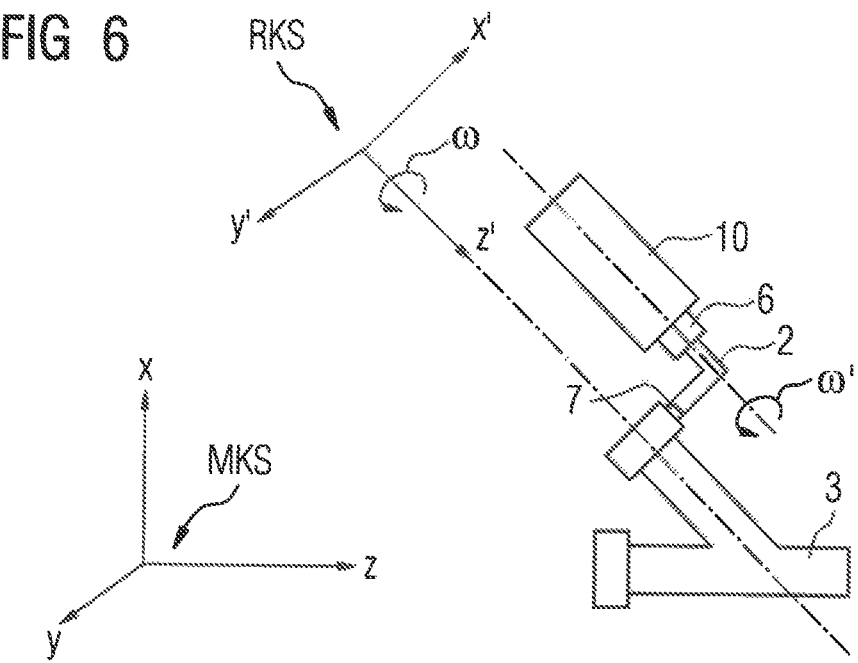
Figure 7:
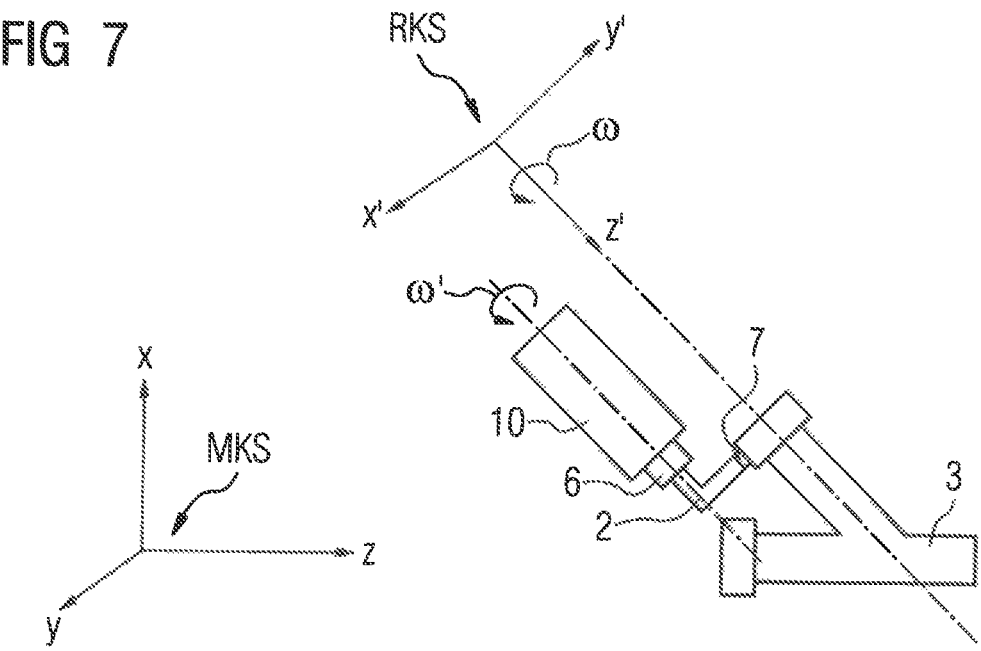

According to a particular feature of the coordinate transformation in accordance with the invention, the RKS defined as described above now rotates continuously with a constant angular velocity $\omega$ around the z' axis. This causes a constant position and orientation of the tool 2 specified in the RKS to perform, from the perspective of the MKS, a circular movement of the tool 2 with the angular velocity $\omega$ around the z' axis, with the orientation of the cutting edge 7 thus also changing with the angular velocity $\omega$. The angular velocity $\omega'$, with which the tool spindle rotates 6 around the tool spindle axis SA, is hence identical to the angular velocity $\omega$ with which the RKS rotates around the z' axis. The rotation of the tool spindle 6 is therefore synchronous with the rotation of the RKS. In the exemplary embodiment, the cutting edge 7 therefore remains oriented parallel to the x' axis at all times, such that the cutting edge 7 points at all times toward the z axis as the tool 2 rotates. This is illustrated in FIGS. 6 and 7, which show the workpiece machining at two different points in time. An observer moving in conjunction with the RKS therefore sees a fixed tool with a constant orientation and a workpiece section 9 rotating around the z' axis. However this represents the typical starting situation for the machining mode "turning" when using a conventional turning tool.

Starting from this starting situation, the (rotationally symmetrical) contour of the workpiece section 9 to be machined is specified in the x'-z' plane. The tool paths are then calculated in the controller 8 from the specified contour as with a conventional turning tool, Taking into consideration the coordinate transformation described above, the controller 8 then converts the tool paths calculated for the RKS into tool paths with respect to the MKS and the corresponding coordinated movements of the relevant machine tool axes L1 to L3 and B of the machine tool 1.

FIG. 8 illustrates major method steps in the execution of a method according to the invention. In a first method step S1, an MKS that is fixed with respect to the employed machine tool is defined. In a method step S2, a workpiece machining axis is defined for a workpiece section of the workpiece to be machined, with the workpiece to be machined being clamped in the machine tool. The workpiece machining axis is an axis of symmetry of the workpiece section of the workpiece to be machined. In a method step S3, the origin of an RKS is defined on the workpiece machining axis in the MKS, for example by defining a displacement vector. In a method step S4, the orientation of the RKS in relation to the MKS is defined, for which typically three pivoting movements are required. For the special case in which the workpiece machining axis lies in the x-z plane of the MKS, a rotation around the y axis is sufficient so that the z' axis of the RKS coincides with the workpiece machining axis. In a method step S5, the tool path is defined in the RKS, preferably with respect to the axes x' and z' where y=0. The definition of the tool path then largely corresponds to that used in the case of "normal" turning. In a method step S6, the rotation of the tool spindle is started with the angular velocity $\omega$, In a method step S7, the rotation of the RKS about the z' axis with the angular velocity $\omega'$ is started simultaneously. Preferably $\omega'=\omega$. These rotations cause the tool with the oriented cutting edge to rotate around the workpiece section to be machined. Finally, in a method step S8, the tool path specified in step 5 is traversed.

A significant advantage achieved by the invention compared to conventional "interpolation turning" is that existing turning cycles or existing tool paths for turning can be used, and these need only be specified in the RKS. The transformation then allows the machine to execute intrinsically complex axis movements that result in the desired machining, but specifying these axis movements in the RKS is relatively simple and largely corresponds to the guidelines used with conventional "turning".

The basic principle illustrated by the exemplary embodiment can also be applied analogously to more complex machining processes. In particular, it is not essential for the workpiece machining axis to lie in the x-z plane of the MKS. In principle, the workpiece machining axis can lie anywhere in the machine tool working area. However, at least one additional rotary axis of the machine tool may then be required, for example an A axis for executing a pivoting movement of the tool about the x axis or an axis parallel to the x axis.

With respect to the coordinate transformation, a displacement and orientation of the RKS with respect to the MKS in three-dimensional space would generally be required, which causes greater computing complexity in the controller and more complex machine movements compared with the exemplary embodiment. However this in no way affects the advantages for the user of a machine tool configured in this way.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for controlling a relative movement between a tool and a workpiece to be machined with a machine tool, the method comprising:
   defining a machine coordinate system (MKS) in relation to a machine base of the machine tool,
   defining in relation to the MKS a rotation coordinate system (RKS) having an origin and an axis of rotation of a selected RKS coordinate axis, with the RKS rotating about the axis of rotation with an angular velocity,
   defining in the RKS a tool spindle axis about which a tool spindle holding the tool can be rotated about the tool spindle axis for relative movement with respect to the workpiece commensurate with a tool path of the tool defined in the RKS,
   defining the RKS a workpiece machining axis of a workpiece section of the workpiece to be machined,
   aligning the axis of rotation of the selected RKS coordinate axis relative to the workpiece such that the axis of rotation lies on the workpiece machining axis,
   aligning a cutting edge of the tool in the RKS so as to have with respect to an axis in the RKS a constant orientation that is perpendicular to the axis of rotation of the selected RKS coordinate axis,
   transforming the tool path of the tool defined in the RKS into the MKS, and
   controlling the relative movement in the MKS according to the transformed tool path.

2. The method of claim 1, further comprising:
   defining a workpiece machining axis of a workpiece section of the workpiece to be machined with the tool, and
   aligning the axis of rotation relative to the workpiece such that the axis of rotation lies on the workpiece machining axis.

3. The method of claim 2, wherein the workpiece machining axis is an axis of symmetry of the workpiece section.

4. The method of claim 1, wherein the selected coordinate axis is oriented parallel to the axis of rotation.

5. The method of claim 1, wherein the position and orientation of the rotation coordinate system (RKS) is specified in the machine coordinate system (MKS) such that the selected coordinate axis lies on the axis of rotation.

6. The method of claim 1, wherein the machine coordinate system (MKS) and/or the rotation coordinate system (RKS) are realized as Cartesian coordinate systems.

7. The method of claim 1, wherein the tool is moved relative to the workpiece by way of at least three translational axes and at least one rotational axis.

8. The method of claim 1, wherein the tool spindle is aligned relative to the rotation coordinate system (RKS) such that the tool spindle axis lies in a plane defined by two coordinate axes of the rotation coordinate system (RKS).

9. The method of claim 8, wherein the tool spindle is aligned parallel to the selected coordinate axis of the rotation coordinate system (RKS).

10. The method of claim 1, wherein the orientation of the cutting edge in the rotation coordinate system (RKS) is retained during machining of the workpiece.

11. The method of claim 2, wherein the tool path is determined based on a specified contour of the workpiece section.

12. The method of claim 1, wherein the tool path is defined by a turning cycle programmed for a conventional turning tool operation.

13. A machine tool for machining a workpiece affixed to a workpiece holder of the machine tool, comprising:
   a tool spindle rotatable about a tool spindle axis and holding a tool constructed to machine the workpiece,
   at least three translational axes and at least one rotational axis, and
   a numerical controller controlling a relative movement between the tool and the workpiece,
   wherein the numerical controller is configured to:
      define a machine coordinate system (MKS) in relation to a machine base of the machine tool,
      define in relation to the MKS a rotation coordinate system (RKS) having an origin and an axis of rotation of a selected RKS coordinate axis, with the RKS rotating about the axis of rotation with an angular velocity,
      define in the RKS a tool spindle axis about which a tool spindle holding the tool can be rotated about the tool spindle axis for relative movement with respect to the workpiece commensurate with a tool path of the tool defined in the RKS,
      define in the RKS a workpiece machining axis of a workpiece section of the workpiece to be machined,
      align the axis of rotation of the selected RKS coordinate axis relative to the workpiece such that the axis of rotation lies on the workpiece machining axis,
      align a cutting edge of the tool in the RKS so as to have with respect to an axis in the RKS a constant orientation that is perpendicular to the axis of rotation of the selected RKS coordinate axis,
      transform the tool path of the tool defined in the RKS into the MKS, and
      control the relative movement in the MKS according to the transformed tool path.

14. The machine tool of claim 13, wherein a selected coordinate axis of the rotation coordinate system (RKS) is defined as the axis of rotation.

15. The machine tool of claim 13, wherein the machine coordinate system (MKS) and/or the rotation coordinate system (RKS) are Cartesian coordinate systems.

16. The machine tool of claim 13, wherein the orientation of the at least one cutting edge in the rotation coordinate system (RKS) is constant during machining of the workpiece.

17. The machine tool of claim 13, wherein the axis of rotation is aligned relative to the workpiece such that the axis of rotation lies on a workpiece machining axis of a workpiece section of the workpiece to be machined by the tool.

18. The machine tool of claim 17, wherein the workpiece machining axis is defined as an axis of symmetry of the workpiece section of the workpiece to be machined by the tool.

19. The machine tool of claim 13, wherein the tool spindle is aligned relative to the rotation coordinate system (RKS) such that the tool spindle axis lies in a plane defined by two coordinate axes of the rotation coordinate system (RKS).

* * * * *